United States Patent
Tan et al.

(10) Patent No.: US 9,383,574 B2
(45) Date of Patent: Jul. 5, 2016

(54) TRANSLATION MIRROR BASED BEAM STEERING MECHANISM WITH ULTRAHIGH FREQUENCY RESPONSE AND HIGH SENSITIVITY

(71) Applicant: Harbin Institute of Technology, Harbin, Heilongjiang (CN)

(72) Inventors: Jiubin Tan, Heilongjiang (CN); Fan Zhu, Heilongjiang (CN); Jiwen Cui, Heilongjiang (CN)

(73) Assignee: HARBIN INSTITUTE OF TECHNOLOGY, Harbin (CN)

(*) Notice: Subject to any disclaimer, the term of this patent is extended or adjusted under 35 U.S.C. 154(b) by 77 days.

(21) Appl. No.: 13/980,036

(22) PCT Filed: Sep. 28, 2012

(86) PCT No.: PCT/CN2012/081902
§ 371 (c)(1),
(2) Date: Jul. 16, 2013

(87) PCT Pub. No.: WO2013/044784
PCT Pub. Date: Apr. 4, 2013

(65) Prior Publication Data
US 2014/0198367 A1    Jul. 17, 2014

(30) Foreign Application Priority Data
Sep. 28, 2011  (CN) .......................... 2011 1 0290113

(51) Int. Cl.
*G02B 26/08* (2006.01)
*G02B 26/10* (2006.01)
(Continued)

(52) U.S. Cl.
CPC ........... *G02B 26/0816* (2013.01); *G01S 7/4817* (2013.01); *G02B 26/0858* (2013.01); *G02B 26/101* (2013.01); *H01S 3/0071* (2013.01); *G01S 17/42* (2013.01)

(58) Field of Classification Search
CPC .......... G02B 5/02; G02B 5/08–5/0875; G02B 7/003; G02B 7/005; G02B 7/18; G02B 7/182–7/1822; G02B 7/1827–7/1828; G02B 9/04–9/10; G02B 17/00; G02B 17/004; G02B 17/006; G02B 17/08; G02B 17/0864–17/0868; G02B 19/00; G02B 19/0028; G02B 19/0047–19/0061; G02B 19/009; G02B 26/00; G02B 26/08; G02B 26/0816; G02B 26/0833–26/0866; G02B 26/10; G02B 26/101; G02B 26/105; G02B 27/30; G02B 6/003; G02B 2006/0098; G01S 7/4817
USPC .................... 359/196.1, 197.1–199.4, 200.6, 359/201.1–202.1, 205.1–207.6, 213.1, 359/214.1, 215.1, 221.2, 223.1, 225.1, 359/226.2, 641, 744, 793–795, 850, 857, 359/862, 865, 871–874, 876–877
See application file for complete search history.

(56) References Cited

U.S. PATENT DOCUMENTS 3,944,727 A    3/1976  Elliott
4,232,964 A *  11/1980  Nodov et al. ................... 355/70
(Continued)

FOREIGN PATENT DOCUMENTS

CN    101059334 A    10/2007
CN    102354051 A    2/2012
(Continued)

OTHER PUBLICATIONS

Glöckner et al., "Micro-opto-mechanical beam deflectors," Opt Eng 36(5), May 1997, pp. 1339-1345.*
(Continued)

*Primary Examiner* — Stephone B Allen
*Assistant Examiner* — Adam W Booher
(74) *Attorney, Agent, or Firm* — Troutman Sanders LLP; Ryan A. Schneider; Benjamin C. Wiles

(57) ABSTRACT

This invention relates to a beam steering mechanism with ultrahigh frequency response and high sensitivity, which is based on the translation of two mirrors. Beam steering is achieved by the translations of two mirrors in the X axial mirror group and Y axial mirror group. The two translation mirrors are located at the output ends of two PZT actuators, and are directly actuated by the two PZT actuators. The dynamic characteristics of the two translation mirrors are always exactly the same as the output characteristics of the PZT actuators. There is no mechanical translation loss in this beam steering mechanism, and so, the beam steering mechanism has an ultrahigh frequency response and high angular deflection sensitivity.

10 Claims, 3 Drawing Sheets

(51) Int. Cl.
*G01S 7/481* (2006.01)
*H01S 3/00* (2006.01)
*G01S 17/42* (2006.01)

(56) References Cited

U.S. PATENT DOCUMENTS

| | | | | |
|---|---|---|---|---|
| 4,266,846 | A | * | 5/1981 | Ih .................................. 359/18 |
| 4,273,443 | A | * | 6/1981 | Hogg ............................ 356/343 |
| 4,997,242 | A | * | 3/1991 | Amos ........................ 359/202.1 |
| 5,526,165 | A | * | 6/1996 | Toda et al. ................. 359/202.1 |
| 5,646,765 | A | * | 7/1997 | Laakmann et al. ........ 359/202.1 |

FOREIGN PATENT DOCUMENTS

| | | |
|---|---|---|
| JP | S6079204 A | 5/1985 |
| WO | 2006076474 A1 | 7/2006 |

OTHER PUBLICATIONS

International Search Report mailed Jan. 10, 2013 for priority application PCT/CN2012/081902.

* cited by examiner

TRANSLATION MIRROR BASED BEAM STEERING MECHANISM WITH ULTRAHIGH FREQUENCY RESPONSE AND HIGH SENSITIVITY

CROSS-REFERENCE TO RELATED APPLICATIONS

This application claims the benefit of Chinese patent application No. 201110290113.6 filed Sep. 28, 2011, and entitled "Translation Mirror Based Beam Steering Mechanism with Ultrahigh Frequency Response and High Sensitivity" which is incorporated by reference as if set forth herein in its entirety.

BACKGROUND OF THE INVENTION

1. Technical Field of the Invention

This invention relates to a translation mirror based beam steering mechanism, which can be used to achieve angular deflection of light beam with ultrahigh frequency response and high sensitivity.

2. Technical Background

A beam steering mechanism is often used in an optical system for angular deflection of light beam. For example, it can be used to adjust the ensemble tilt of beam wavefront in an adaptive optical system, or to align a beam in a wireless optical communication system. It can also be used to scan a beam in a wide-range to rapidly aim and track a target in a laser radar system, or to stabilize a beam in a high energy laser system or a precise alignment system. For the realistic application of such an optical system, it is essential for the beam steering mechanism to have the high frequency response and high deflection sensitivity required to ensure the deflection accuracy of beam. In addition, a wide deflection range is also required for a beam steering mechanism in some of its applications, for example, its application in a laser radar system.

A traditional mechanical beam steering mechanism is usually based on a cardan joint or flexure hinge, and it is still in wide use for beam steering at present.

A mirror is assembled on the gimbal in a cardan joint based mechanical beam steering mechanism. The mirror is rotated together with the gimbal to achieve beam deflection in any direction. A cardan joint based mechanical beam steering mechanism can be used to achieve a large beam deflection range. But a big-inertia rack must be operated to deflect the beam. As a result, the frequency response is slow and it is hard to achieve high deflection accuracy, too. Therefore, it is suitable for beam steering with moderate accuracy and low frequency response only.

A flexure hinge based beam steering mechanism has a compact structure and it has no friction loss. It employs a piece of piezoelectric ceramics (PZT) or a voice coil motor (VCM) to drive the flexure hinge or to directly drive the mirror to deflect a light beam. Due to the high displacement sensitivity of PZT or VCM, its deflection sensitivity is very high, but its deflection frequency response is limited by the resonant frequency of a flexure hinge. With the increasingly stringent requirement for beam deflection sensitivity in a realistic application, the deflection sensitivity of a flexure hinge structure has to be further improved for a particular displacement sensitivity of PZT. The flexure hinge is therefore required to be as flexible as possible, and its rocker beam is required to be as long as possible. These two factors decrease the frequency response of a flexure hinge. So the deflection sensitivity and frequency response of a flexure hinge based beam steering mechanism are in conflict with each other.

X. Li, et al. from Institute of Optics & Electronics, Chinese Academy of Sciences, proposed a fast steering mirror with a single point resilient mounting asymmetric structure. They established the dynamic model of a fast beam steering mirror, and used a filter technology to reduce the mechanical oscillation of a fast steering mirror to improve the control stability and bandwidth of the fast beam steering mirror. However, the mechanical oscillation was not primarily eliminated by improving the structure. The effect of filtering was directly determined by the established dynamic model, and it is hard to establish such an accurate dynamic model to improve its control stability and bandwidth.

H. Zhu, et al. from Institute of Optics & Electronics, Chinese Academy of Sciences, proposed a piezoelectric fast steering mirror based on a radial fastening thin plane. The radial fastening thin plane was added between a mirror and an actuator, to limit the radial deflection of the mirror and to enhance the axial stiffness of the proposed system. The stiffness distribution was effectively improved while the resonance frequency was increased. However, the structure of a piezoelectric fast steering mirror is too complex to be assembled. The resolution of beam deflection is limited by the short distance between the actuating point and the rotation center of the mirror.

D. Fan, et al. from National University of Defense Technology, invented a resolution-multiplication flexure structure based beam steering mechanism (Patent application no. CN 101794020.A) in 2010. They used a resolution-multiplication lever to improve the beam deflection resolution. The beam steering mechanism proposed featured a compact structure, a high positioning accuracy, and a high deflection resolution. However, the parallel-guiding flexure structure and the flexure hinge of resolution-multiplication lever are made of leaf spring. So the frequency response of the beam steering mechanism is slow and the mechanism can not be used for an application with fast response required.

Most of the mechanical beam steering mechanisms developed in recent years are mainly based on decentered lens, rotating prisms, decentered micro-lens array, or electrowetting microprisms. Here are some of the examples.

J. Gibson, et al. from University of Dayton, proposed a decentered lens beam steering system. They used one fixed lens and another lens moveable in lateral direction to deflect the emergent beam. In contrast with a conventional mechanical beam steering mechanism, their proposed system had no rotational movement, but it had a wide deflection range of more than 45°. A similar structure was used in the national standard of straightness and flatness in the former Soviet Union. The deflection of incident beam with respect to the optical axis could be transformed into the lateral displacement of the emergent beam. The deflection of the emergent beam with respect to the incident beam could be thus achieved for the purpose of correcting the angular drift of light beam. They also proposed a rotating prism based beam steering mechanism. They rotated two oppositely positioned achromatic doublet prisms with the incident beam as the rotation axis to deflect the emergent beam. Their decentered lens and rotating prism based beam steering mechanisms could be used to provide a resolution of 1 mrad, a deflection speed of 1 rad/s, and a deflection range of more than 45°. Because beam deflection was realized by the moving lens and prisms, movable parts were not improved in their size, quality or wear. So, it is difficult to improve the frequency response of beam deflection. In addition, the movement of lens in a 2D direction causes cross-talk and it is rather complicated to control the rotation of two prisms, too.

A. Akatay and H. Urey from Koc University proposed a micro-lens array based beam steering mechanism with high beam deflection resolution. The proposed system consisted a pair of micro-lens with several micro intervals between them. Collimated beam was focused by a prepset micro-lens and collimated again by a postpositive micro-lens. The emergent collimated beam was deflected when one micro-lens had a lateral movement with respect to the other. The beam steering mechanism was effectively improved in its size, quality and wear when a conventional optical component was replaced by a micro-optics. A very short relative displacement was needed for a large deflection of beam, and the short relative displacement for the same angle deflection become shorter as the micro-lens become smaller in size. The beam steering mechanism had a high beam scanning efficiency. However, its deflection range was just several degrees, and its transmissivity was also low. In addition, the manufacturing technology used was crucial for the performance of the beam steering mechanism, and it is still immature in engineering applications at present.

N. R. Smith, et al. from University of Cincinnati proposed a beam steering mechanism based on electrowetting microprisms. They loaded liquid material with a refractive index in micro-cavities. The liquid was electrically grounded and a voltage was applied to the side-wall. The top surface of the liquid in the cavity tilted as the voltage varied, and an electrowetting microprism with a steerable wedge angle was thus formed. The wedge angle could be changed by changing the voltage of side-wall to deflect the emergent light. The deflection range of the beam was relative to the refractive index of liquid and could go up to 30°, and the response could be within milliseconds. However, due to the shadow effect of cavity side-wall, there was a light intensity loss to a certain extent. The voltage between opposite side-walls could be dozens of volts, and the difference in voltage between opposite side-walls had to be increased to achieve a large beam deflection range. The interval between side-walls ranged from micrometers to millimeters. So a great electric field was formed in the cavity, which could lead to an electro-discharge breakdown. In addition, the manufacturing technology used was fairly complex.

Purpose of the Invention:

The purpose of this invention is to propose a translation mirror based beam steering mechanism, which can be used for beam deflection with ultra-high frequency response and high sensitivity.

In order to attain the purpose mentioned above, a translation mirror based beam steering mechanism with ultrahigh frequency response and high sensitivity is presented as detailed below.

A translation mirror based beam steering mechanism with ultrahigh frequency response and high sensitivity comprising an X axial mirror group constituted by a primary translation mirror being set in a tilting position along the emergent beam path of a preset positive lens and being located at the output end of primary PZT actuator; a primary fixed mirror being positioned along the path of beam reflected from primary translation mirror, and is disposed in parallel with primary translation mirror; wherein the primary PZT actuator is connected electrically with a PZT driver source;

an Y axial mirror group constituted by a secondary translation mirror being positioned along the path of beam reflected from primary fixed mirror and being located on the output end of secondary PZT actuator; a secondary fixed mirror being positioned along the path of beam reflected from secondary translation mirror, and is disposed in parallel with secondary translation mirror, wherein the secondary PZT actuator is connected electrically to the PZT driver source; wherein a collimating positive or a negative lens is positioned along the path of beam reflected from secondary fixed mirror; the PZT driver source is connected electrically to a computer system; the focal plane of collimating positive lens or the virtual focal plane of the collimating negative lens coincides with the plane on which the preset positive lens is focused so that the collimating positive or negative lens and the preset positive lens constitute an afocal system.

This invention has the following advantages:

(1) The preset positive lens and the collimating lens are confocal, so the emergent beam remains collimated after incident collimated beam transmits through the two lens. In comparison with existing beam steering mechanisms, the two lens are fixed, and beam deflection is realized by shifting the location of the focal point of the preset positive lens.

(2) There is no mechanical transmission loss because the focal point of the preset positive lens is shifted by a mirror which is directly actuated by the same PZT actuator. The dynamic characteristics of the mirror is always exactly the same as the output characteristics of the PZT actuator. So, beam deflection can be achieved using the beam steering mechanism with high sensitivity and ultrahigh frequency response.

The characteristics of this invention due to the technologies adopted are as follows:

(1) The 2D movement of the focal point of the preset positive lens is driven by the X axial mirror group or the Y axial mirror group. So there is no cross-talk in any 2D deflection of emergent collimated beam.

(2) After being focused by the preset positive lens, the incident collimated beam is reflected by the X axial mirror group or the Y axial mirror group, and the radius of the beam is diminished which helps the adoption of a smaller mirror to realize the movement of the focal point. The size and quality of the mirror is decreased and the stationarity and frequency response of the translation mirror is therefore significantly improved.

(3) The deflection range of emergent beam is determined by the radio of the displacement of focal point and the F number of the collimating lens. The deflection sensitivity is determined by ratio of the output resolution of the PZT actuator and the F number of the collimating lens. The F number of the collimating lens can be flexibly chosen for beam deflection with different range and sensitivity, while the frequency response remains unchanged.

REFERENCE SIGNS USED IN THE DRAWINGS

Figure 1:
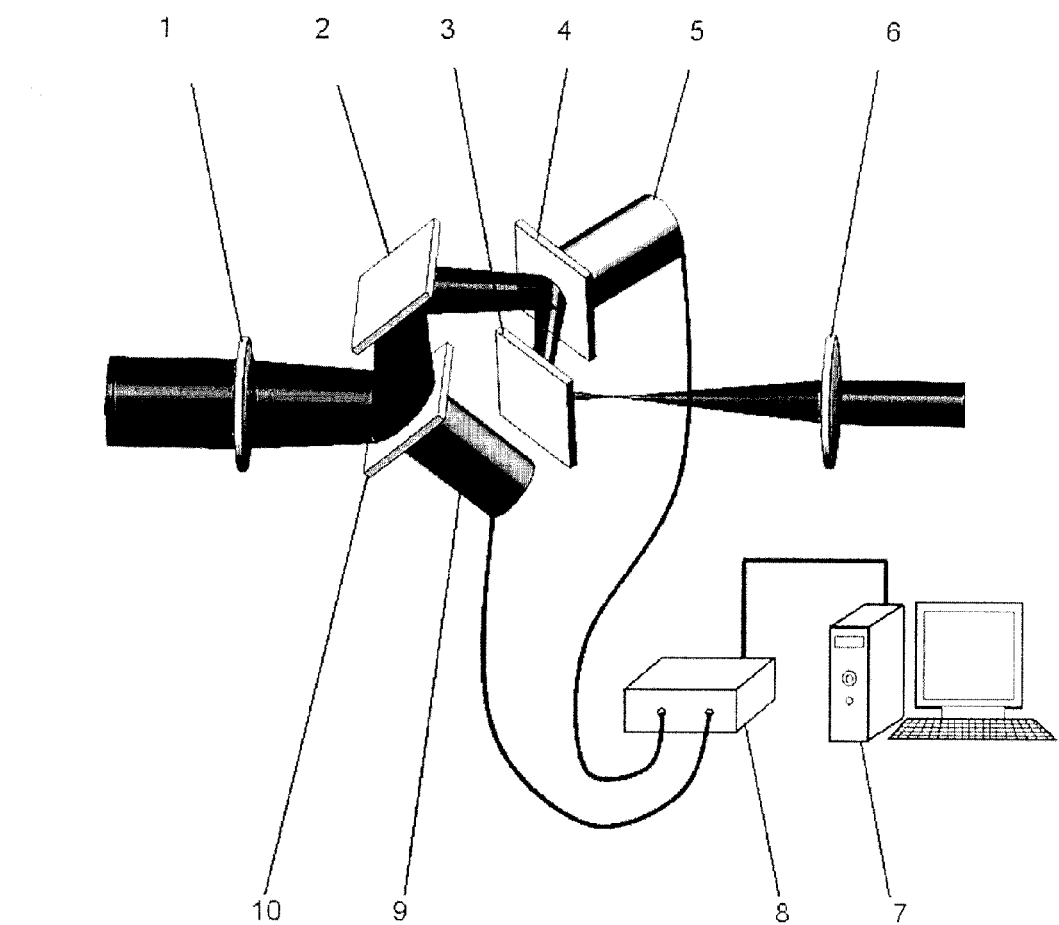
FIG. 1 illustrates the overall construction of translation mirror based beam steering mechanism.

1 preset positive lens;
2 primary fixed mirror;

3 secondary fixed mirror;
4 secondary translation mirror;
5 secondary PZT actuator;
6 collimating positive or negative lens;
7 computer system;
8 PZT driver source;
9 primary PZT actuator;
10 primary translation mirror.

PREFERRED EMBODIMENTS OF THE INVENTION

Preferred Embodiment 1

The translation mirror based beam steering mechanism consists of preset positive lens 1, an X axial mirror group, an Y axial mirror group, collimating positive lens 6, and computer system 7;

Preset positive lens 1 is a positive lens. Incident collimated beam is focused by preset positive lens 1.

The X axial mirror group consists of primary fixed mirror 2, primary PZT actuator 9, PZT driver source 8, and primary translation mirror 10 which is located at the output end of primary PZT actuator 9. Primary fixed mirror 2 is positioned on the path of the beam reflected from primary translation mirror 10, and it is disposed in parallel with the primary translation mirror 10. The beam focused by preset positive lens 1 is reflected by primary translation mirror 10 and primary fixed mirror 2. Primary PZT actuator 9 is driven by PZT driver source 8, and primary translation mirror 10 follows the output of primary PZT actuator 9 to shift the focal point of preset positive lens 1 in X direction.

The Y axial mirror group consists of secondary fixed mirror 3, secondary PZT actuator 5, PZT driver source 8, and secondary translation mirror 4 which is located at the output end of secondary PZT actuator 5. Secondary fixed mirror 3 is positioned on the path of the beam reflected from secondary translation mirror 4, and it is disposed in parallel with secondary translation mirror 4. The beam focused by preset positive lens 1 is reflected by secondary translation mirror 4 and secondary fixed mirror 3. Secondary PZT actuator 5 is driven by PZT driver source 8, and secondary translation mirror 4 follows the output of secondary PZT actuator 5 to shift the focal point of preset positive lens 1 in Y direction.

The focal plane of collimating positive lens 6 coincides with the focal plane on which the beam is focused by preset positive lens 1. Collimating positive lens 6 and preset positive lens 1 constitute an afocal system. After incident collimated beam transmits through the two lens, the emergent beam remains collimated. The focal point of the incident beam focused by preset positive lens 1 is shifted by the X axial mirror group or the Y axial mirror group. The direction of emergent collimated beam is thus deflected.

Computer system 7 calculates the magnitude of focal point displacement on the focal plane of collimating positive lens 6 according to the required angle of deflection. The calculated magnitude of focal point displacement is exported to PZT driver source 8 to drive PZT actuator 5 and PZT actuator 9, to translate secondary translation mirror 4 and primary translation mirror 10 respectively. The focal point is shifted in direction X or Y on the focal plane of collimating positive lens 6. The required deflection angle of emergent collimated beam is thus achieved.

Preferred Embodiment 2

Preset positive lens 1 is a positive lens while collimating negative lens 6 is a negative lens. The virtual focal plane of the collimating negative lens 6 coincides with the plane on which the preset positive lens 1 is focused so that the collimating negative lens 6 and the preset positive lens 1 constitute an afocal system. All the other constitutions remain the same as those in preferred embodiment 1.

Figure 2A:
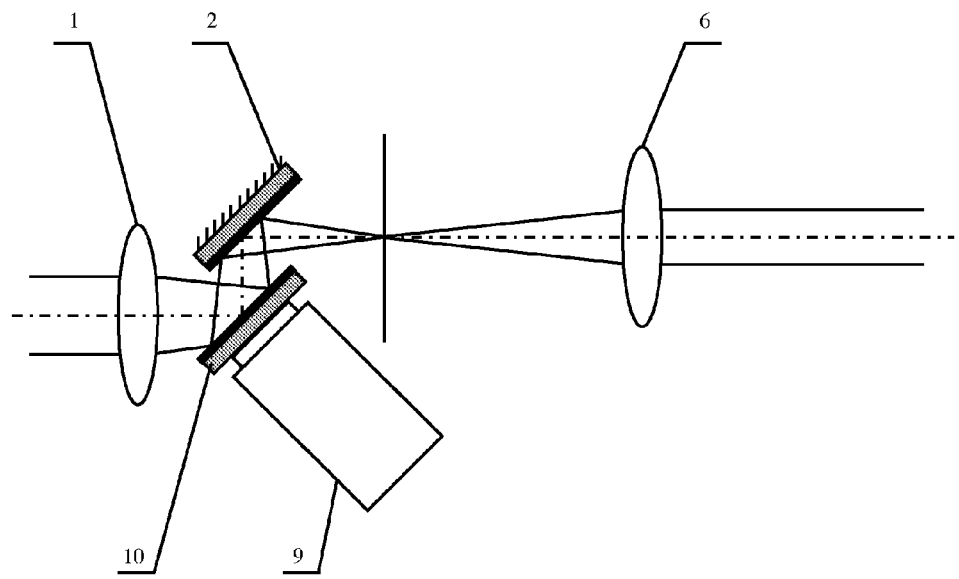
FIG. 2a shows the initial direction of emergent beam when a positive lens is the collimating lens.
Figure 2B:
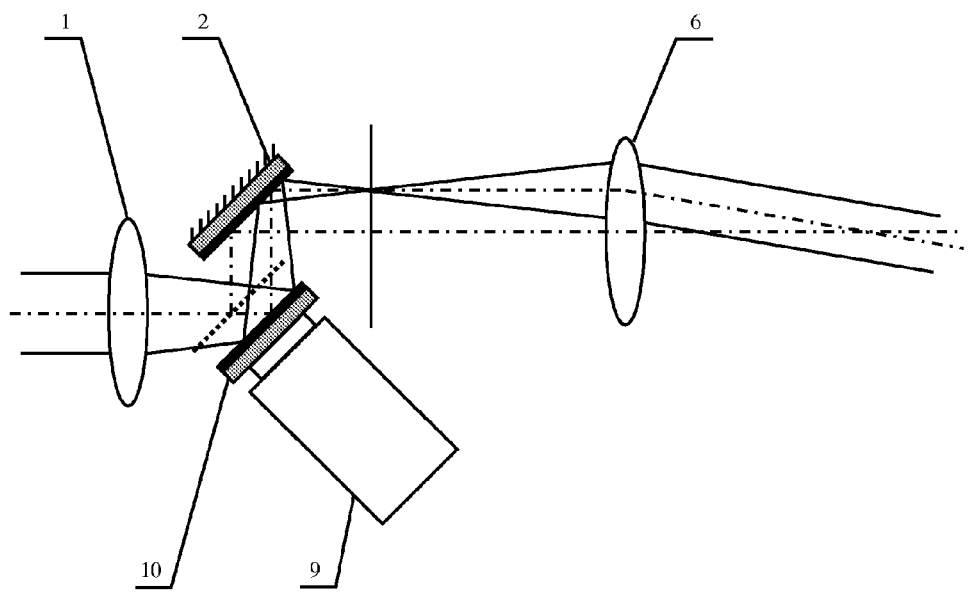
FIG. 2b shows the direction of emergent beam after the primary translation mirror is moved when a positive lens is the collimating lens.

FIG. 2a shows the initial direction of emergent beam when a positive lens is the collimating lens and FIG. 2b shows the direction of emergent beam after the primary translation mirror is moved when a positive lens is the collimating lens.

Figure 3A:
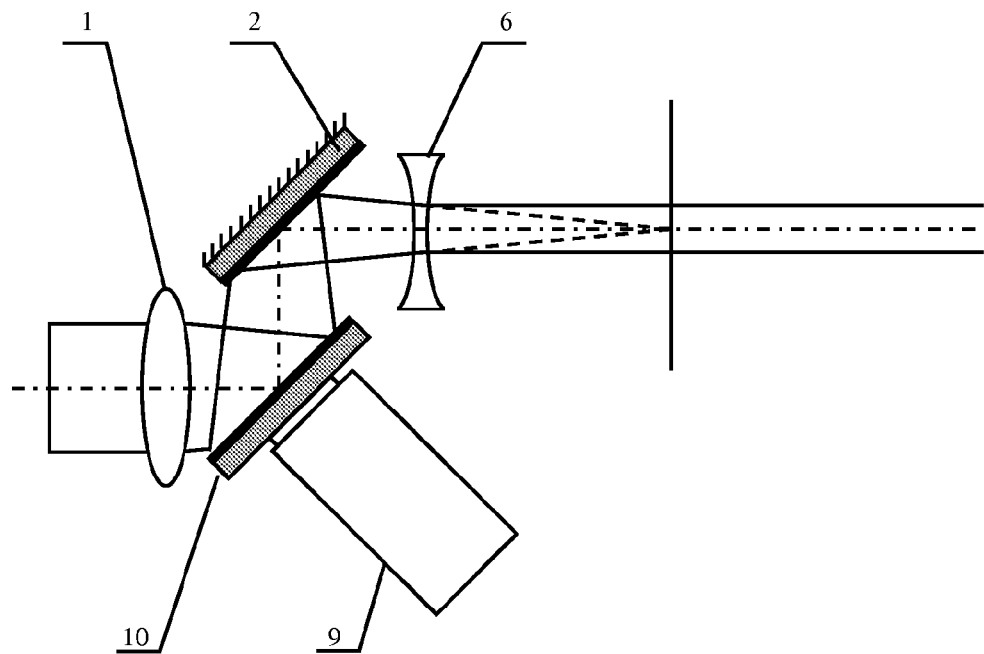
FIG. 3a shows the initial direction of emergent beam when a negative lens is the collimating lens.
Figure 3B:
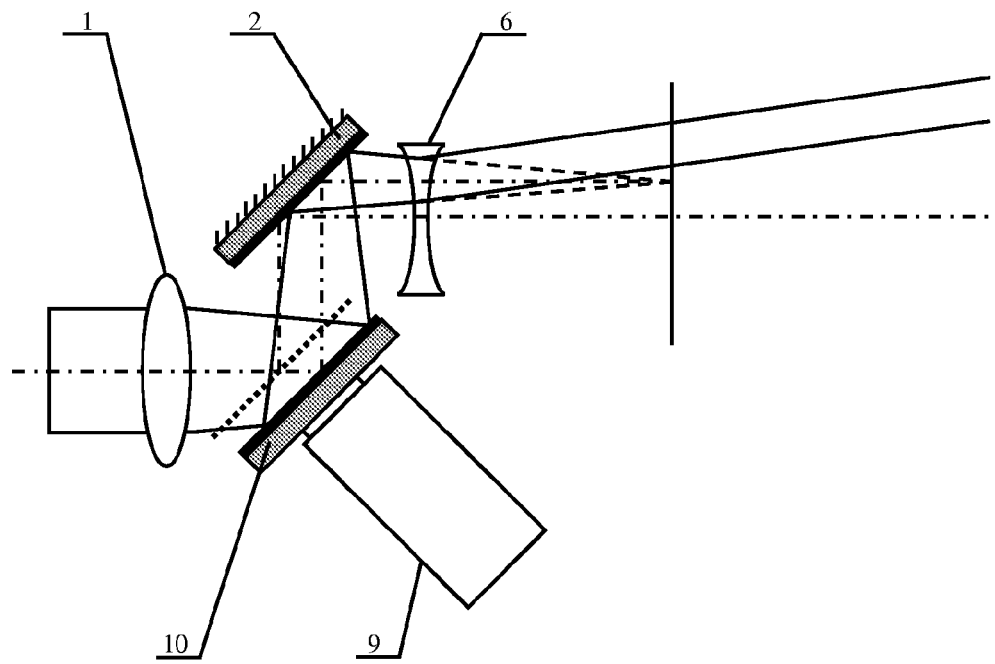
FIG. 3b shows the direction of emergent beam after the primary translation mirror is moved when a negative lens is the collimating lens.

FIG. 3a shows the initial direction of emergent beam when a negative lens is the collimating lens and FIG. 3b shows the direction of emergent beam after the primary translation mirror is moved when a negative lens is the collimating lens.

What is claimed is:

1. A translation mirror-based beam steering mechanism comprising:
   a preset positive lens to focus an incident collimated beam;
   an X axial mirror group including:
      a primary translation mirror in a tilting position along an emergent beam path of the preset positive lens and located at an output end of a primary actuator; and
      a primary fixed mirror positioned along a path of a beam reflected from the primary translation mirror and disposed in parallel with the primary translation mirror, wherein the primary actuator is electrically connected to a driver source;
   a Y axial mirror group including:
      a secondary translation mirror positioned along a path of a beam reflected from the primary fixed mirror and located on an output end of a secondary actuator; and
      a secondary fixed mirror positioned along a path of a beam reflected from secondary translation mirror and disposed in parallel with the secondary translation mirror, wherein the secondary actuator is electrically connected to the driver source; and
   a collimating lens positioned along a path of a beam reflected from the secondary fixed mirror to collimate to an output collimated beam;
   wherein a focal plane of the collimating lens coincides with a plane on which the preset positive lens is focused so that the collimating lens and the preset positive lens constitute an afocal system.

2. The translation mirror-based beam steering mechanism of claim 1, wherein the primary actuator comprises a primary piezoelectric ceramic actuator.

3. The translation mirror-based beam steering mechanism of claim 1, wherein the secondary actuator comprises a secondary piezoelectric ceramic actuator.

4. The translation mirror-based beam steering mechanism of claim 1, wherein the driver source comprises a piezoelectric ceramic driver source.

5. The translation mirror-based beam steering mechanism of claim 1, wherein the collimating lens comprises a positive lens having a focal plane.

6. The translation mirror-based beam steering mechanism of claim 1, wherein the collimating lens comprises a negative lens having a virtual focal plane.

7. The translation mirror-based beam steering mechanism of claim 1, wherein the driver source is electrically connected to a computer system.

8. The translation mirror-based beam steering mechanism of claim 1, wherein the primary actuator comprises a primary piezoelectric ceramic actuator;
   wherein the secondary actuator comprises a secondary piezoelectric ceramic actuator;
   wherein the driver source comprises a piezoelectric ceramic driver source;

wherein the collimating lens comprises one of a positive lens having a focal plane or a negative lens having a virtual focal plane; and wherein the piezoelectric ceramic driver source is electrically connected to a computer system.

9. The translation mirror-based beam steering mechanism of claim 1, wherein the translational shift of the focal point of the beam is translated into an angular deflection of the output collimated beam by the collimating lens.

10. A translation mirror based beam steering mechanism with ultrahigh frequency response and high sensitivity comprising:

a preset positive lens to focus an incident collimated beam;

an X axial mirror group including:
  a primary translation mirror being set in a tilting position along the emergent beam path of the preset positive lens and being located at the output end of a primary piezoelectric ceramic actuator; and
  a primary fixed mirror being positioned along the path of the beam reflected from the primary translation mirror, and being disposed in parallel with the primary translation mirror, wherein the primary piezoelectric ceramic actuator is connected electrically to a piezoelectric ceramic driver source;

a Y axial mirror group including:
  a secondary translation mirror being positioned along the path of the beam reflected from the primary fixed mirror and being located on the output end of a secondary piezoelectric ceramic actuator; and
  a secondary fixed mirror being positioned along the path of the beam reflected from secondary translation mirror, and being disposed in parallel with the secondary translation mirror, wherein the secondary piezoelectric ceramic actuator is connected electrically to the piezoelectric ceramic driver source; and a collimating positive or a negative lens being positioned along the path of the beam reflected from secondary fixed mirror to collimate to an output collimated beam;

wherein the piezoelectric ceramic driver source is connected electrically to a computer system; and wherein the focal plane of the collimating positive lens or the virtual focal plane of the collimating negative lens coincides with the plane on which the preset positive lens is focused so that the collimating positive or negative lens and the preset positive lens constitute an afocal system.

* * * * *